United States Patent
Nguyen et al.

(10) Patent No.: US 7,345,011 B2
(45) Date of Patent: *Mar. 18, 2008

(54) METHODS FOR MITIGATING THE PRODUCTION OF WATER FROM SUBTERRANEAN FORMATIONS

(75) Inventors: Philip D. Nguyen, Duncan, OK (US); David L. Brown, Temple, OK (US); Bhadra D. Desai, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 282 days.

This patent is subject to a terminal disclaimer.

(21) Appl. No.: 10/684,697

(22) Filed: Oct. 14, 2003

(65) Prior Publication Data

US 2005/0079981 A1 Apr. 14, 2005

(51) Int. Cl.
*E21B 43/00* (2006.01)

(52) U.S. Cl. ............... 507/220; 507/268; 507/266; 507/264; 507/219; 166/295

(58) Field of Classification Search ........... 507/219, 507/220, 268, 266, 264; 166/281, 295
See application file for complete search history.

(56) References Cited

U.S. PATENT DOCUMENTS

| | | | |
|---|---|---|---|
| 2,238,671 A | 4/1941 | Woodhouse ............... 166/21 |
| 2,703,316 A | 3/1955 | Schneider ............... 260/78.3 |
| 2,869,642 A | 1/1959 | McKay et al. |
| 3,047,067 A | 7/1962 | Williams et al. ............... 166/33 |
| 3,123,138 A | 3/1964 | Robichaux ............... 166/33 |
| 3,176,768 A | 4/1965 | Brandt et al. ............... 166/33 |
| 3,199,590 A | 8/1965 | Young ............... 166/33 |
| 3,272,650 A | 9/1966 | MacVittie ............... 134/7 |
| 3,297,086 A | 1/1967 | Spain ............... 166/33 |
| 3,308,885 A | 3/1967 | Sandiford ............... 166/33 |
| 3,316,965 A | 5/1967 | Watanabe ............... 166/33 |
| 3,336,980 A | 8/1967 | Rike ............... 166/295 |
| 3,375,872 A | 4/1968 | McLaughlin et al. ............... 166/29 |
| 3,404,735 A | 10/1968 | Young et al. ............... 166/33 |
| 3,415,320 A | 12/1968 | Young ............... 166/33 |
| 3,492,147 A | 1/1970 | Young et al. ............... 117/62.2 |
| 3,659,651 A | 5/1972 | Graham ............... 166/280 |
| 3,681,287 A | 8/1972 | Brown et al. ............... 260/67 |
| 3,708,013 A | 1/1973 | Dismuke ............... 166/276 |
| 3,709,298 A | 1/1973 | Pramann ............... 166/276 |
| 3,754,598 A | 8/1973 | Holloway, Jr. ............... 166/249 |
| 3,765,804 A | 10/1973 | Brandon ............... 417/540 |
| 3,768,564 A | 10/1973 | Knox et al. ............... 166/307 |
| 3,784,585 A | 1/1974 | Schmitt et al. ............... 260/861 |
| 3,819,525 A | 6/1974 | Hattenbrun ............... 252/132 |
| 3,828,854 A | 8/1974 | Templeton et al. ............... 166/307 |
| 3,842,911 A | 10/1974 | Know et al. ............... 166/307 |
| 3,854,533 A | 12/1974 | Gurley et al. ............... 166/276 |
| 3,857,444 A | 12/1974 | Copeland ............... 166/276 |
| 3,863,709 A | 2/1975 | Fitch ............... 165/1 |
| 3,868,998 A | 3/1975 | Lybarger et al. ............... 166/278 |
| 3,888,311 A | 6/1975 | Cooke, Jr. ............... 166/280 |
| 3,912,692 A | 10/1975 | Casey et al. ............... 260/78.3 |
| 3,948,672 A | 4/1976 | Harnberger ............... 106/90 |
| 3,955,993 A | 5/1976 | Curtice et al. ............... 106/90 |
| 3,960,736 A | 6/1976 | Free et al. ............... 252/8.55 R |
| 4,008,763 A | 2/1977 | Lowe et al. ............... 166/253 |
| 4,015,995 A * | 4/1977 | Hess ............... 106/287.28 |
| 4,029,148 A | 6/1977 | Emery ............... 166/250.1 |
| 4,031,958 A | 6/1977 | Sandiford et al. ............... 166/270 |
| 4,042,032 A | 8/1977 | Anderson et al. ............... 166/276 |
| 4,070,865 A | 1/1978 | McLaughlin ............... 61/36 |
| 4,074,760 A | 2/1978 | Copeland et al. ............... 166/276 |
| 4,085,801 A * | 4/1978 | Sifferman et al. ............... 166/295 |
| 4,085,802 A | 4/1978 | Sifferman et al. ............... 166/295 |
| 4,127,173 A | 11/1978 | Watkins et al. ............... 166/276 |
| 4,169,798 A | 10/1979 | DeMartino ............... 252/8.55 R |
| 4,172,066 A | 10/1979 | Zweigle et al. ............... 260/29.6 TA |
| 4,245,702 A | 1/1981 | Haafkens et al. ............... 166/307 |
| 4,273,187 A | 6/1981 | Satter et al. ............... 166/250 |
| 4,291,766 A | 9/1981 | Davies et al. ............... 166/276 |
| 4,305,463 A | 12/1981 | Zakiewicz ............... 106/245 |
| 4,336,842 A | 6/1982 | Graham et al. ............... 166/276 |
| 4,352,674 A | 10/1982 | Fery ............... 23/230 |

(Continued)

FOREIGN PATENT DOCUMENTS

CA 2063877 5/2003

(Continued)

OTHER PUBLICATIONS

Foreign Search Report and Opinion (PCT Appl. No. GB2004/004242), Jun. 10, 2004.

(Continued)

*Primary Examiner*—Margaret G. Moore
(74) *Attorney, Agent, or Firm*—Robert A. Kent; Baker Botts, L.L.P.

(57) ABSTRACT

The present invention relates to treatment operations in subterranean zones, and more particularly, to consolidation compositions and methods of using these consolidation compositions to mitigate water production from subterranean formations. The present invention provides methods for mitigating the production of water from a subterranean formation by injecting consolidation compositions comprising a furan-based resin into an interval in the subterranean formation.

59 Claims, No Drawings

U.S. PATENT DOCUMENTS

| | | | | |
|---|---|---|---|---|
| 4,353,806 A | 10/1982 | Canter et al. | | 507/229 |
| 4,387,769 A | 6/1983 | Erbstoesser et al. | | 166/295 |
| 4,399,866 A * | 8/1983 | Dearth | | 166/245 |
| 4,415,805 A | 11/1983 | Fertl et al. | | 250/260 |
| 4,439,489 A | 3/1984 | Johnson et al. | | 428/404 |
| 4,443,347 A | 4/1984 | Underdown et al. | | 252/8.55 R |
| 4,460,052 A | 7/1984 | Gockel | | 175/72 |
| 4,470,915 A | 9/1984 | Conway | | 252/8.55 R |
| 4,493,875 A | 1/1985 | Beck et al. | | 428/403 |
| 4,494,605 A | 1/1985 | Wiechel et al. | | 166/288 |
| 4,498,995 A | 2/1985 | Gockel | | 252/8.5 LC |
| 4,501,328 A | 2/1985 | Nichols | | 166/288 |
| 4,526,695 A | 7/1985 | Erbstosser et al. | | 252/8.55 R |
| 4,527,627 A | 7/1985 | Graham et al. | | 166/280 |
| 4,541,489 A | 9/1985 | Wu | | 166/312 |
| 4,546,012 A | 10/1985 | Brooks | | 427/213 |
| 4,553,596 A | 11/1985 | Graham et al. | | 166/295 |
| 4,564,459 A | 1/1986 | Underdown et al. | | 252/8.55 R |
| 4,572,803 A | 2/1986 | Yamazoe et al. | | 534/16 |
| 4,585,064 A | 4/1986 | Graham et al. | | 166/280 |
| 4,649,998 A | 3/1987 | Friedman | | 166/294 |
| 4,664,819 A | 5/1987 | Glaze et al. | | 252/8.551 |
| 4,665,988 A | 5/1987 | Murphey et al. | | 166/295 |
| 4,669,543 A * | 6/1987 | Young | | 166/276 |
| 4,675,140 A | 6/1987 | Sparks et al. | | 264/4.3 |
| 4,683,954 A | 8/1987 | Walker et al. | | 166/307 |
| 4,694,905 A | 9/1987 | Armbruster | | 166/280 |
| 4,715,967 A | 12/1987 | Bellis | | 252/8.551 |
| 4,716,964 A | 1/1988 | Erbstoesser et al. | | 166/284 |
| 4,733,729 A | 3/1988 | Copeland | | 166/276 |
| 4,739,832 A | 4/1988 | Jennings, Jr. et al. | | 166/299 |
| 4,785,884 A | 11/1988 | Armbruster | | 166/280 |
| 4,787,453 A | 11/1988 | Hewgill et al. | | 166/272.3 |
| 4,789,105 A | 12/1988 | Hosokawa et al. | | 241/67 |
| 4,796,701 A | 1/1989 | Hudson et al. | | 166/278 |
| 4,797,262 A | 1/1989 | Dewitz | | 422/142 |
| 4,800,960 A | 1/1989 | Friedman et al. | | 166/276 |
| 4,809,783 A | 3/1989 | Hollenbeck et al. | | 166/307 |
| 4,817,721 A | 4/1989 | Pober | | 166/295 |
| 4,829,100 A | 5/1989 | Murphey et al. | | 523/131 |
| 4,838,352 A | 6/1989 | Oberste-Padtberg et al. | | 166/291 |
| 4,842,072 A | 6/1989 | Friedman et al. | | 166/295 |
| 4,843,118 A | 6/1989 | Lai et al. | | 524/555 |
| 4,848,467 A | 7/1989 | Cantu et al. | | 166/281 |
| 4,848,470 A | 7/1989 | Korpics | | 166/312 |
| 4,850,430 A | 7/1989 | Copeland et al. | | 166/276 |
| 4,886,354 A | 12/1989 | Welch et al. | | 356/70 |
| 4,888,240 A | 12/1989 | Graham et al. | | 428/403 |
| 4,895,207 A | 1/1990 | Friedman et al. | | 166/276 |
| 4,903,770 A | 2/1990 | Friedman et al. | | 166/288 |
| 4,934,456 A | 6/1990 | Moradi-Araghi | | 166/270 |
| 4,936,385 A | 6/1990 | Weaver et al. | | 166/288 |
| 4,942,186 A | 7/1990 | Murphey et al. | | 523/131 |
| 4,957,165 A | 9/1990 | Cantu et al. | | 166/295 |
| 4,959,432 A | 9/1990 | Fan et al. | | 526/287 |
| 4,961,466 A | 10/1990 | Himes et al. | | 166/250 |
| 4,969,522 A | 11/1990 | Whitehurst et al. | | 166/278 |
| 4,969,523 A | 11/1990 | Martin et al. | | 166/278 |
| 4,986,353 A | 1/1991 | Clark et al. | | 166/279 |
| 4,986,354 A | 1/1991 | Cantu et al. | | 166/276 |
| 4,986,355 A | 1/1991 | Casad et al. | | 166/295 |
| 5,030,603 A | 7/1991 | Rumpf et al. | | 501/127 |
| 5,049,743 A | 9/1991 | Taylor, III et al. | | 250/303 |
| 5,082,056 A | 1/1992 | Tackett, Jr. | | 166/295 |
| 5,105,886 A | 4/1992 | Strubhar et al. | | 166/280 |
| 5,107,928 A | 4/1992 | Hilterhaus | | 166/293 |
| 5,128,390 A | 7/1992 | Murphey et al. | | 523/130 |
| 5,135,051 A | 8/1992 | Facteau et al. | | 166/104 |
| 5,142,023 A | 8/1992 | Gruber et al. | | 528/354 |
| 5,165,438 A | 11/1992 | Facteau et al. | | 137/1 |
| 5,173,527 A | 12/1992 | Calve | | 524/74 |
| 5,178,218 A | 1/1993 | Dees | | 166/281 |
| 5,182,051 A | 1/1993 | Bandy et al. | | 252/645 |
| 5,199,491 A | 4/1993 | Kutt et al. | | 166/276 |
| 5,199,492 A | 4/1993 | Surles et al. | | 166/295 |
| 5,211,234 A | 5/1993 | Floyd | | 166/276 |
| 5,216,050 A | 6/1993 | Sinclair | | 524/108 |
| 5,218,038 A | 6/1993 | Johnson et al. | | 524/541 |
| 5,232,955 A | 8/1993 | Cabai et al. | | 521/63 |
| 5,232,961 A | 8/1993 | Murphey et al. | | 523/414 |
| 5,238,068 A | 8/1993 | Fredrickson | | 166/307 |
| 5,247,059 A | 9/1993 | Gruber et al. | | 528/354 |
| 5,249,628 A | 10/1993 | Surjaatmada | | 166/305 |
| 5,256,729 A | 10/1993 | Kutt et al. | | 524/700 |
| 5,273,115 A | 12/1993 | Spafford | | 166/281 |
| 5,285,849 A | 2/1994 | Surles et al. | | 166/295 |
| 5,293,939 A | 3/1994 | Surles et al. | | 166/295 |
| 5,295,542 A | 3/1994 | Cole et al. | | 166/278 |
| 5,320,171 A | 6/1994 | Laramay | | 166/285 |
| 5,321,062 A | 6/1994 | Landrum et al. | | 523/141 |
| 5,325,923 A | 7/1994 | Surjaatmadja et al. | | 166/308 |
| 5,330,005 A | 7/1994 | Card et al. | | 166/280 |
| 5,332,037 A | 7/1994 | Schmidt et al. | | 166/276 |
| 5,335,726 A | 8/1994 | Rodrgues | | 166/295 |
| 5,351,754 A | 10/1994 | Hardin et al. | | 166/249 |
| 5,358,051 A | 10/1994 | Rodrigues | | 166/295 |
| 5,359,026 A | 10/1994 | Gruber | | 528/354 |
| 5,360,068 A | 11/1994 | Sprunt et al. | | 166/259 |
| 5,361,856 A | 11/1994 | Surjaatmadja et al. | | 175/67 |
| 5,363,916 A | 11/1994 | Himes et al. | | 166/276 |
| 5,373,901 A | 12/1994 | Norman et al. | | 166/300 |
| 5,377,759 A * | 1/1995 | Surles | | 166/295 |
| 5,381,864 A | 1/1995 | Nguyen et al. | | 166/280 |
| 5,386,874 A | 2/1995 | Laramay et al. | | 166/300 |
| 5,388,648 A | 2/1995 | Jordan, Jr. | | 166/380 |
| 5,393,810 A | 2/1995 | Harris et al. | | 524/56 |
| 5,396,957 A | 3/1995 | Surjaatmadja et al. | | 166/308 |
| 5,402,846 A | 4/1995 | Jennings, Jr. et al. | | 166/259 |
| 5,422,183 A | 6/1995 | Sinclair et al. | | 428/403 |
| 5,423,381 A | 6/1995 | Surles et al. | | 166/295 |
| 5,439,055 A | 8/1995 | Card et al. | | 166/280 |
| 5,460,226 A | 10/1995 | Lawon et al. | | 166/300 |
| 5,464,060 A | 11/1995 | Hale et al. | | 166/293 |
| 5,475,080 A | 12/1995 | Gruber et al. | | 528/354 |
| 5,484,881 A | 1/1996 | Gruber et al. | | 528/54 |
| 5,494,103 A | 2/1996 | Surjaatmadja et al. | | 166/222 |
| 5,494,178 A | 2/1996 | Maharg | | 166/276 |
| 5,497,830 A | 3/1996 | Boles et al. | | 166/300 |
| 5,498,280 A | 3/1996 | Fistner et al. | | 106/19 |
| 5,499,678 A | 3/1996 | Surjaatmadja et al. | | 166/298 |
| 5,501,275 A | 3/1996 | Card et al. | | 166/280 |
| 5,505,787 A | 4/1996 | Yamaguchi | | 134/4 |
| 5,512,071 A | 4/1996 | Yam et al. | | 51/307 |
| 5,520,250 A | 5/1996 | Harry et al. | | 166/278 |
| 5,522,460 A | 6/1996 | Shu | | 166/295 |
| 5,529,123 A | 6/1996 | Carpenter et al. | | 166/293 |
| 5,531,274 A | 7/1996 | Bienvenu, Jr. | | 166/280 |
| 5,536,807 A | 7/1996 | Gruber et al. | | 528/354 |
| 5,545,824 A | 8/1996 | Stengel et al. | | 524/590 |
| 5,547,023 A | 8/1996 | McDaniel et al. | | 166/280 |
| 5,551,513 A | 9/1996 | Surles et al. | | 166/278 |
| 5,551,514 A | 9/1996 | Nelson et al. | | 166/280 |
| 5,582,249 A | 12/1996 | Caveny et al. | | 166/276 |
| 5,582,250 A | 12/1996 | Constien | | 166/280 |
| 5,588,488 A | 12/1996 | Vijn et al. | | 166/293 |
| 5,591,700 A | 1/1997 | Harris et al. | | 507/204 |
| 5,594,095 A | 1/1997 | Gruber et al. | | 528/354 |
| 5,595,245 A | 1/1997 | Scott, III | | 166/250.1 |
| 5,597,784 A | 1/1997 | Sinclair et al. | | |
| 5,604,184 A | 2/1997 | Ellis et al. | | 507/117 |
| 5,604,186 A | 2/1997 | Hunt et al. | | 507/204 |
| 5,609,207 A | 3/1997 | Dewprashad et al. | | 166/276 |
| 5,620,049 A | 4/1997 | Gipson et al. | | 166/248 |

| | | | | | | | |
|---|---|---|---|---|---|---|---|
| 5,639,806 A | 6/1997 | Johnson et al. | 523/208 | 6,079,492 A | 6/2000 | Hoogteijling et al. | 166/276 |
| 5,670,473 A | 9/1997 | Scepanski | 510/445 | 6,098,711 A | 8/2000 | Chatterji et al. | 166/294 |
| 5,692,566 A * | 12/1997 | Surles | 166/295 | 6,114,410 A | 9/2000 | Betzold | 523/130 |
| 5,697,440 A | 12/1997 | Weaver et al. | 166/281 | 6,123,871 A | 9/2000 | Carroll | 252/301.36 |
| 5,698,322 A | 12/1997 | Tsai et al. | 428/373 | 6,123,965 A | 9/2000 | Jacon et al. | 424/489 |
| 5,701,956 A | 12/1997 | Hardy et al. | 166/295 | 6,124,246 A | 9/2000 | Heathman et al. | 507/219 |
| 5,712,314 A | 1/1998 | Surles et al. | 521/41 | 6,130,286 A | 10/2000 | Thomas et al. | 524/507 |
| 5,732,364 A | 3/1998 | Kalb et al. | 588/8 | 6,135,987 A | 10/2000 | Tsai et al. | 604/365 |
| 5,765,642 A | 6/1998 | Surjaatmadja | 166/297 | 6,140,446 A | 10/2000 | Fujiki et al. | 528/15 |
| 5,775,425 A | 7/1998 | Weaver et al. | 166/276 | 6,148,911 A | 11/2000 | Gipson et al. | 166/248 |
| 5,782,300 A | 7/1998 | James et al. | 166/278 | 6,152,234 A | 11/2000 | Newhouse et al. | 166/403 |
| 5,783,822 A | 7/1998 | Buchanan et al. | 250/259 | 6,162,766 A | 12/2000 | Muir et al. | 507/267 |
| 5,787,986 A | 8/1998 | Weaver et al. | 166/280 | 6,169,058 B1 | 1/2001 | Le et al. | 507/222 |
| 5,791,415 A | 8/1998 | Nguyen et al. | 166/280 | 6,172,011 B1 | 1/2001 | Card et al. | 507/204 |
| 5,799,734 A | 9/1998 | Norman et al. | 166/278 | 6,172,077 B1 | 1/2001 | Curtis et al. | 514/278 |
| 5,806,593 A | 9/1998 | Sures | 166/276 | 6,176,315 B1 | 1/2001 | Reddy et al. | 166/295 |
| 5,830,987 A | 11/1998 | Smith | 528/332 | 6,177,484 B1 * | 1/2001 | Surles | 166/295 |
| 5,833,000 A | 11/1998 | Weaver et al. | 166/276 | 6,184,311 B1 | 2/2001 | O'Keefe et al. | 525/438 |
| 5,833,361 A | 11/1998 | Funk | 366/80 | 6,187,834 B1 | 2/2001 | Thayer et al. | 522/15 |
| 5,836,391 A | 11/1998 | Jonasson et al. | 166/295 | 6,187,839 B1 | 2/2001 | Eoff et al. | 523/130 |
| 5,836,392 A | 11/1998 | Urlwin-Smith | 166/295 | 6,189,615 B1 | 2/2001 | Sydansk | 166/270 |
| 5,837,656 A | 11/1998 | Sinclair et al. | 507/220 | 6,192,985 B1 | 2/2001 | Hinkel et al. | 166/280 |
| 5,837,785 A | 11/1998 | Kinsho et al. | 525/527 | 6,192,986 B1 | 2/2001 | Urlwin-Smith | 166/295 |
| 5,839,510 A | 11/1998 | Weaver et al. | 166/276 | 6,196,317 B1 | 3/2001 | Hardy | 166/295 |
| 5,840,784 A | 11/1998 | Funkhouser et al. | 523/130 | 6,202,751 B1 | 3/2001 | Chatterji et al. | 166/276 |
| 5,849,401 A | 12/1998 | El-Afandi et al. | 428/215 | 6,209,643 B1 | 4/2001 | Nguyen et al. | 166/276 |
| 5,849,590 A | 12/1998 | Anderson, II et al. | 436/27 | 6,209,644 B1 | 4/2001 | Brunet | 166/297 |
| 5,853,048 A | 12/1998 | Weaver et al. | 166/279 | 6,209,646 B1 | 4/2001 | Reddy et al. | 166/300 |
| 5,864,003 A | 1/1999 | Qureshi et al. | 528/141 | 6,210,471 B1 | 4/2001 | Craig | 106/31.08 |
| 5,865,936 A | 2/1999 | Edelman et al. | 156/310 | 6,214,773 B1 | 4/2001 | Harris et al. | 507/271 |
| 5,871,049 A | 2/1999 | Weaver et al. | 166/276 | 6,231,664 B1 | 5/2001 | Chatterji et al. | 106/724 |
| 5,873,413 A | 2/1999 | Chatterji et al. | 166/293 | 6,234,251 B1 | 5/2001 | Chatterji et al. | 166/295 |
| 5,875,844 A | 3/1999 | Chatterji et al. | 166/293 | 6,238,597 B1 | 5/2001 | Yim et al. | 252/512 |
| 5,875,845 A | 3/1999 | Chatterji et al. | 166/293 | 6,241,019 B1 | 6/2001 | Davidson et al. | 166/249 |
| 5,875,846 A | 3/1999 | Chatterji et al. | 166/293 | 6,242,390 B1 | 6/2001 | Mitchell et al. | 507/211 |
| 5,893,383 A | 4/1999 | Facteau | 137/14 | 6,244,344 B1 | 6/2001 | Chatterji et al. | 166/295 |
| 5,893,416 A | 4/1999 | Read | 166/304 | 6,257,335 B1 | 7/2001 | Nguyen et al. | 166/280 |
| 5,908,073 A | 6/1999 | Nguyen et al. | 166/276 | 6,260,622 B1 | 7/2001 | Blok et al. | 166/305.1 |
| 5,911,282 A | 6/1999 | Onan et al. | 175/72 | 6,271,181 B1 | 8/2001 | Chatterji et al. | 507/219 |
| 5,916,933 A | 6/1999 | Johnson et al. | 523/208 | 6,274,650 B1 | 8/2001 | Cui | 523/457 |
| 5,921,317 A | 7/1999 | Dewprashad et al. | 166/208 | 6,279,652 B1 | 8/2001 | Chatterji et al. | 166/194 |
| 5,924,488 A | 7/1999 | Nguyen et al. | 166/280 | 6,279,656 B1 | 8/2001 | Sinclair et al. | 166/310 |
| 5,929,437 A | 7/1999 | Elliott et al. | 250/259 | 6,283,214 B1 | 9/2001 | Guinot et al. | 166/297 |
| 5,944,105 A | 8/1999 | Nguyen | 166/278 | 6,302,207 B1 | 10/2001 | Nguyen et al. | 166/276 |
| 5,944,106 A | 8/1999 | Dalrymple et al. | 166/281 | 6,306,998 B1 | 10/2001 | Kimura et al. | 528/12 |
| 5,945,387 A | 8/1999 | Chatterji et al. | 507/224 | 6,311,773 B1 | 11/2001 | Todd et al. | 166/280 |
| 5,948,734 A | 9/1999 | Sinclair et al. | 507/219 | 6,321,841 B1 | 11/2001 | Eoff et al. | 166/291 |
| 5,957,204 A | 9/1999 | Chatterji et al. | 166/295 | 6,323,307 B1 | 11/2001 | Bigg et al. | 528/354 |
| 5,960,877 A | 10/1999 | Funkhouser et al. | 166/270 | 6,326,458 B1 | 12/2001 | Gruber et al. | 528/354 |
| 5,960,880 A | 10/1999 | Nguyen et al. | 166/280 | 6,328,105 B1 | 12/2001 | Betzold | 166/280 |
| 5,964,291 A | 10/1999 | Bourne et al. | 166/279 | 6,328,106 B1 | 12/2001 | Griffith et al. | 166/295 |
| 5,969,006 A | 10/1999 | Onan et al. | 523/166 | 6,330,916 B1 | 12/2001 | Rickards et al. | 166/280 |
| 5,977,283 A | 11/1999 | Rossitto | 528/44 | 6,330,917 B2 | 12/2001 | Chatterji et al. | 166/295 |
| 5,994,785 A | 11/1999 | Higuchi et al. | 527/789 | 6,350,309 B2 | 2/2002 | Chatterji et al. | 106/677 |
| RE36,466 E | 12/1999 | Nelson et al. | 166/280 | 6,357,527 B1 | 3/2002 | Norman et al. | 166/300 |
| 6,003,600 A | 12/1999 | Nguyen et al. | 166/281 | 6,364,018 B1 | 4/2002 | Brannon et al. | 166/280.2 |
| 6,004,400 A | 12/1999 | Bishop et al. | 134/2 | 6,364,945 B1 | 4/2002 | Chatterji et al. | 106/677 |
| 6,006,835 A | 12/1999 | Onan et al. | 166/295 | 6,367,165 B1 | 4/2002 | Huttlin | 34/582 |
| 6,006,836 A | 12/1999 | Chatterji et al. | 166/295 | 6,367,549 B1 | 4/2002 | Chatterji et al. | 166/292 |
| 6,012,524 A | 1/2000 | Chatterji et al. | 166/295 | 6,372,678 B1 | 4/2002 | Youngman et al. | 504/128 |
| 6,016,870 A | 1/2000 | Dewprashad et al. | 166/295 | 6,376,571 B1 | 4/2002 | Chawla et al. | 522/64 |
| 6,024,170 A | 2/2000 | McCabe et al. | 166/300 | 6,387,986 B1 | 5/2002 | Moradi-Araghi et al. | 523/211 |
| 6,028,113 A | 2/2000 | Scepanski | 514/643 | 6,390,195 B1 | 5/2002 | Nguyen et al. | 166/276 |
| 6,028,534 A | 2/2000 | Ciglenec et al. | 340/856.2 | 6,401,817 B1 | 6/2002 | Griffith et al. | 166/295 |
| 6,040,398 A | 3/2000 | Kinsho et al. | 525/527 | 6,405,797 B2 | 6/2002 | Davidson et al. | 166/249 |
| 6,047,772 A | 4/2000 | Weaver et al. | 166/276 | 6,406,789 B1 | 6/2002 | McDaniel et al. | 428/403 |
| 6,059,034 A | 5/2000 | Rickards et al. | 166/280 | 6,408,943 B1 | 6/2002 | Schultz et al. | 166/285 |
| 6,059,035 A | 5/2000 | Chatterji et al. | 166/293 | 6,422,314 B1 | 7/2002 | Todd et al. | 166/312 |
| 6,059,036 A | 5/2000 | Chatterji et al. | 166/294 | 6,439,309 B1 | 8/2002 | Matherly et al. | 166/276 |
| 6,068,055 A | 5/2000 | Chatterji et al. | 166/293 | 6,439,310 B1 | 8/2002 | Scott, III et al. | 166/308 |
| 6,069,117 A | 5/2000 | Onan et al. | 507/202 | 6,440,255 B1 | 8/2002 | Kohlhammer et al. | 156/283 |
| 6,070,664 A | 6/2000 | Dalrymple et al. | 166/281 | 6,446,727 B1 | 9/2002 | Zemlak et al. | 166/308 |
| 6,074,739 A | 6/2000 | Katagiri | 428/323 | 6,448,206 B1 | 9/2002 | Griffith et al. | 507/219 |

| Patent No. | Date | Inventor | Class |
|---|---|---|---|
| 6,450,260 B1 | 9/2002 | James et al. | 166/277 |
| 6,454,003 B1 | 9/2002 | Chang et al. | 166/270 |
| 6,458,885 B1 | 10/2002 | Stengel et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,778 B1 * | 10/2003 | Ayoub et al. | 507/202 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 | 5/2004 | Nguyen et al. | 166/280.2 |
| 6,732,800 B2 * | 5/2004 | Acock et al. | 166/308.1 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 6,978,836 B2 | 12/2005 | Nguyen et al. | 166/295 |
| 7,028,774 B2 * | 4/2006 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0019496 A1 | 1/2004 | Angle et al. | 166/295 |
| 2004/0040706 A1 | 3/2004 | Hossaini et all. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0034862 A1 * | 2/2005 | Nguyen | 166/281 |
| 2005/0045326 A1 | 3/2005 | Nguyen | 166/278 |
| 2005/0051331 A1 | 3/2005 | Nguyen et al. | 166/280.2 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398460 A1 | 3/2004 |
| EP | 1403466 A2 | 3/2004 |
| EP | 1464789 A1 | 10/2004 |
| GB | 1107584 | 3/1968 |
| GB | 1264180 | 12/1969 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/037946 A1 | 5/2004 |
| WO | WO 2004/038176 A1 | 5/2004 |
| WO | WO 2005/021928 A2 | 3/2005 |

OTHER PUBLICATIONS

Halliburton, *CoalStim*[SM] *Service, Helps Boost Cash Flow From CBM Assets*, Stimulation, HO3679 Oct. 3, 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 4, 2004, Halliburton Communications.

Halliburton Technical Flier—Multi Stage Frac Completion Methods, 2 pages.

Halliburton "*CobraFrac$^{SM}$ Service, Coiled Tubing Fracturing—Cost-Effective Method for Stimulating Untapped Reserves*", 2 pages, 2004.

Halliburton "*CobraJetFrac$^{SM}$ Service, Cost-Effective Technology That Can Help Reduce Cost per BOE Produced, Shorten Cycle time and Reduce Capex*".

Halliburton Cobra Frac Advertisement, 2001.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 4, 2004, Halliburton Communications.

Almond et al., *Factors Affecting Proppant Flowback With Resin Coated Proppants*, SPE 30096, pp. 171-186, May 1995.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*", edited by A.-C. Alberston, pp. 1-138, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "*Poly(phenylactide): Synthesis, Characterization, and Hydrolytic Degradation, Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch. 12, pp. 147-159, 2001.

Cantu et al., "*Laboratory and Field Evaluation of a Combined Fluid-Loss Control Additive and Gel Breaker for Fracturing Fluids*," SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polyactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, "*What is Coalbed Methane?*" CDX, LLC. Available @ www.cdxgas.com/what.html, printed p. 1.

Halliburton brochure entitled "H2Zero™ Service Introducing The Next Generation of cost-Effective Conformance Control Solutions", 2002.

Halliburton brochure entitled INJECTROL® A Component: 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

\* cited by examiner

METHODS FOR MITIGATING THE PRODUCTION OF WATER FROM SUBTERRANEAN FORMATIONS

BACKGROUND OF THE INVENTION

The present invention relates to treatment operations in subterranean zones, and more particularly, to consolidation compositions and methods of using these consolidation compositions to mitigate water production from subterranean formations.

The production of water with oil and/or gas from wells constitutes a major problem and expense in the production of oil and gas. While oil and gas wells are usually completed in hydrocarbon producing zones, a water bearing zone may occasionally be present adjacent to the hydrocarbon producing zone. In some circumstances, the higher mobility of the water may allow it to flow into the hydrocarbon producing zone by way of, inter alia, natural fractures and high permeability streaks. In some circumstances, the ratio of water to hydrocarbons recovered may become sufficiently high that the cost of producing, separating, and disposing of the water may represent a significant economic loss.

One attempt to reduce the production of water has been to place viscous polymers into water and hydrocarbon producing formations so as to cause them to enter the water-producing zones within and adjacent to the formations such that they may cross-link therein. The cross-linking of the viscous polymers tends to produce stiff gels, which may eliminate, or at least reduce, the flow of water through the natural fractures and high permeability streaks in the formations. However, such methods have achieved varying degrees of success, as the lack of strength of some of the viscous polymers has often caused them to deteriorate over time, necessitating the performance of additional treatments. This problem is often exacerbated in high temperature reservoirs (e.g., reservoirs having temperatures in excess of about 350° F.), where the viscous polymers tend to degrade at a much faster rate.

SUMMARY OF THE INVENTION

The present invention relates to treatment operations in subterranean zones, and more particularly, to consolidation compositions and methods of using these consolidation compositions to mitigate water production from subterranean formations.

An exemplary embodiment of a method of the present invention is a method of mitigating the production of water from a subterranean formation, comprising the steps of: injecting a consolidation composition comprising a furan-based resin into an interval in the subterranean formation; and permitting the consolidation composition to cure to a desired level of strength therein.

Another exemplary embodiment of a method of the present invention is a method of fracturing a subterranean formation comprising the steps of: injecting a consolidation composition comprising a furan-based resin into a subterranean formation; and injecting a fracturing composition into the subterranean formation so as to create or extend at least one fracture therein, wherein the fracturing composition comprises a carrier fluid and a proppant material.

The features and advantages of the present invention will be readily apparent to those skilled in the art upon a reading of the description of the preferred embodiments, which follows.

DESCRIPTION OF EXEMPLARY EMBODIMENTS

The present invention relates to treatment operations in subterranean zones, and more particularly, to consolidation compositions and methods of using these consolidation compositions to mitigate water production from subterranean formations.

The consolidation compositions of the present invention generally comprise a furan-based resin. Optionally, other additives may be included, including, but not limited to, a silane coupling agent, a surfactant, a diluent, and the like.

The furan-based resin may comprise a variety of resins that further comprise furfuryl alcohol oligomer resin, or a derivative thereof. In certain embodiments, the furan-based resins used in the consolidation compositions of the present invention are capable of enduring temperatures well in excess of 300° F. In certain embodiments, the furan-based-resins used in the consolidation compositions of the present invention are capable of enduring temperatures well in excess of 350° F. without degrading. In certain exemplary embodiments, the furan-based resins are capable of enduring temperatures up to about 700° F. without degrading. Suitable furan-based resins include, but are not limited to, furfuryl alcohol resins, mixtures of furfuryl alcohol resins and aldehydes, and a mixture of furfuryl alcohol resins and phenolic resins. One example of a furan-based resin suitable comprises about 25% to about 45% of a furan-furfuraldehyde homopolymer by weight and about 55% to about 75% of a furfuryl alcohol monomer by weight. Another example of a furan-based resin suitable for use in the methods of the present invention is a phenol/phenol formaldehyde/furfuryl alcohol resin comprising from about 5% to about 30% phenol by weight, from about 40% to about 70% phenol formaldehyde by weight, from about 10% to about 40% furfuryl alcohol by weight.

Optionally, a silane coupling agent may be used in the consolidation compositions of the present invention, inter alia, to act as a mediator to help bond the furan-based resin to particulate surfaces of the subterranean formation. Examples of silane coupling agents that can be used include, but are not limited to, n-2-(aminoethyl)-3-aminopropyltrimethoxysilane, 3-glycidoxypropyltrimethoxysilane, and n-beta-(aminoethyl)-gamma-aminopropyl trimethoxysilane. Where used, the silane coupling agent used is included in an amount capable of sufficiently bonding the resin to the formation particulates. In some embodiments of the present invention, the silane coupling agent used is present in the consolidation composition in the range of from about 0.1% to about 5% by weight of the furan-based resin.

Optionally, a ductility imparting agent may be present in the consolidation compositions of the present invention, inter alia, to improve the furan-based resin's ability to endure changes in the subterranean environment (e.g., cyclic stresses that may occur during times when a well bore is placed on production after having been shut-in, and the like). Examples of suitable ductility imparting agents include, but are not limited to, phthalate materials. In certain exemplary embodiments, the phthalate materials may relax the crosslinking in the cured furan-based resin. Examples of suitable phthalate materials include, but are not limited to, alkyl phthalates such as diethyl phthalate, butyl benzyl phthalate, and di-(2-ethylhexyl)phthalate. Where used in the consolidation compositions of the present invention, the ductility imparting agent may be present in an amount in the range of from about 0.1% to about 10% by weight of the furan-based resin.

Optionally, a surfactant may be present in the consolidation compositions of the present invention. A wide variety of surfactants may be used, including, but not limited to, ethoxylated nonyl phenol phosphate esters, mixtures of one or more cationic surfactants, and one or more non-ionic surfactants and alkyl phosphonate surfactants. The mixtures of one or more cationic and nonionic surfactants suitable for use in the present invention are described in U.S. Pat. No. 6,311,773, the relevant disclosure of which is incorporated herein by reference. In certain exemplary embodiments, a $C_{12}$-$C_{22}$ alkyl phosphonate surfactant is used. Where used, the surfactant or surfactants may be included in the consolidation composition in an amount in the range of from about 0% to about 15% by weight of the furan-based resin.

Optionally, a diluent or liquid carrier fluid may be present in the consolidation compositions of the present invention, inter alia, to reduce the viscosity of the consolidation composition for ease of handling, mixing and transferring. It is within the ability of one skilled in the art, with the benefit of this disclosure, to determine if and how much diluent is needed to achieve a viscosity suitable to a particular subterranean environment. Any suitable diluent that is compatible with the furan-based resin and achieves the desired viscosity effects is suitable for use in the present invention. In certain exemplary embodiments of the present invention, the diluents used have high flash points (most preferably above about 125° F.). Examples of liquid carrier fluids suitable for use in the present invention include, but are not limited to, 2-butoxy ethanol, butyl acetate, and furfuryl acetate. Where used, the diluent is present in the consolidation compositions of the present invention in an amount in the range of from about 1% to about 200% by weight of the furan-based resin.

Optionally, the consolidation compositions of the present invention may further comprise a curing agent, inter alia, to facilitate or accelerate curing of the furan-based resin at lower temperatures. The presence of a curing agent may be particularly useful in certain exemplary embodiments of the present invention where the consolidation compositions of the present invention are placed within subterranean formations having temperatures below about 250 F. Examples of suitable curing agents include, but are not limited to, organic or inorganic acids, such as, inter alia, maleic acid, fumaric acid, sodium bisulfate, phosphoric acid, sulfonic acid, alkyl benzene sulfonic acids such as toluene sulfonic acid and dodecyl benzene sulfonic acid, and combinations thereof. Where used in the consolidation compositions of the present invention, the curing agent may be present in an amount in the range of from about 0.01% to about 10% by weight of the furan-based resin. In certain exemplary embodiments, the curing agent may be present in the consolidation compositions an amount in the range of from about 1% to about 3% by weight of the furan-based resin.

Optionally, the consolidation compositions of the present invention may further comprise a filler material, inter alia, to fill voids, cavities, crevices, channels behind casing strings, or channels within the formation itself. Examples of suitable filler materials include, but are not limited to, microspheres, or silica sand having a particle size in the range of less than about 300 mesh.

Where the consolidation compositions of the present invention are used to isolate an interval in a subterranean formation, the interval to be treated may be isolated, for example, by placing a packer within a well bore in the formation, at a location above and/or below the interval. Optionally, the interval may be treated with a precursor fluid (for example, an aqueous brine having a high salt concentration and further comprising a cationic surfactant), inter alia, to help remove fines from pore spaces and enhance coating of the furan based resin onto the substrate surface of the formation. The consolidation composition is then injected into the subterranean formation at the desired interval, after which excess resin may be displaced out of the well bore. The interval is then shut in for a period of time sufficient to allow the consolidation composition to cure to a desired level of strength, thereby transforming the treated interval within the formation into a substantially impermeable barrier that mitigates water production. In certain exemplary embodiments of the present invention, the interval may be shut in for a period of time in the range of from about 6 hours to about 72 hours, during which the consolidation composition may cure. The time period will depend on factors such as, inter alia, the composition of the furan-based resin, the temperature of the interval in the subterranean formation, and the level of strength desired from the consolidation composition after it cures. One of ordinary skill in the art, with the benefit of this disclosure, will be able to identify the proper time period for curing of the consolidation composition for a particular application.

In addition to isolating water-producing intervals in a subterranean formation, in certain exemplary embodiments the consolidation compositions of the present invention also may be used to prevent gas migration or water channeling behind casing or pipes within a subterranean well bore. In certain exemplary embodiments, this may be accomplished by first isolating the region where undesirable channeling is occurring, then injecting and curing the consolidation compositions of the present invention to fill in such channels.

In another embodiment, the consolidation compositions of the present invention may be used in connection with subterranean fracturing operations, inter alia, to isolate a water-producing interval within the subterranean formation by placing the consolidation composition deep in the formation ahead of the proppant pack. Exemplary methods of fracturing are disclosed in U.S. Pat. Nos. 5,944,106 and 6,070,664, the relevant disclosures of which are hereby incorporated herein by reference. Where used in a fracturing operation, the consolidation compositions of the present invention may be placed in the prepay fluid (e.g., a fluid comprising neither a crosslinker nor proppant) or the pad fluid (e.g., a crosslinked fluid comprising no proppant), ahead of the proppant pack.

An exemplary embodiment of a method of the present invention is a method of mitigating the production of water from a subterranean formation, comprising the steps of injecting a consolidation composition comprising a furan-based resin into an interval in the subterranean formation; and permitting the consolidation composition to cure to a desired level of strength therein. Additional steps may include isolating the interval; treating the interval with a precursor fluid; and displacing excess consolidation composition from the well bore.

Another example of a method of fracturing a subterranean formation comprising the steps of: injecting a consolidation composition comprising a furan-based resin into a subterranean formation; and injecting a fracturing composition into the subterranean formation so as to create or extend at least one fracture therein, wherein the fracturing composition comprises a carrier fluid and a proppant material.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of mitigating the production of water from a subterranean formation comprising:
   injecting a consolidation composition comprising a furan-based resin into an interval in the subterranean formation, wherein the furan-based resin comprises a furan-furfuraldehyde homopolymer and a furfuryl alcohol monomer; and
   permitting the consolidation composition to cure to a desired level of strength therein without the addition of a curing agent.

2. The method of claim 1 further comprising the step of isolating the interval prior to injecting the consolidation composition.

3. The method of claim 2 wherein the interval is isolated by locating a packer above and/or below the interval.

4. The method of claim 2 further comprising the step of treating the interval with a precursor solution prior to injecting the consolidation composition.

5. The method of claim 4 wherein the precursor solution comprises an aqueous brine and a cationic surfactant.

6. The method of claim 4 wherein the interval is located within a subterranean well bore, further comprising the step of displacing excess consolidation composition out of the well bore.

7. The method of claim 1 wherein the furan-furfuraldehyde homopolymer is present in the furan-based resin in an amount in the range of from about 25% to about 45% by weight.

8. The method of claim 1 wherein the furfuryl alcohol monomer is present in the furan-based resin in an amount in the range of from about 55% to about 75% by weight.

9. The method of claim 1 wherein the consolidation composition further comprises a silane coupling agent.

10. The method of claim 9 wherein the silane coupling agent is present in the consolidation composition in an amount sufficient to bond the furan-based resin to particulates in the formation.

11. The method of claim 10 wherein the silane coupling agent is present in the consolidation composition in an amount in the range of from about 0.1% to about 5% by weight of the furan-based resin.

12. The method of claim 9 wherein the silane coupling agent comprises n-2-(aminoethyl)-3-aminopropyltrimethoxysilane, 3-glycidoxypropyltrimethoxysilane, or n-beta-(aminoethyl)-gamma-aminopropyl trimethoxysilane.

13. The method of claim 1 wherein the consolidation composition further comprises a ductility imparting agent.

14. The method of claim 13 wherein the ductility imparting agent comprises phthalate.

15. The method of claim 14 wherein the ductility imparting agent comprises diethyl phthalate, butyl benzyl phthalate, and di-(2-ethylhexyl)phthalate.

16. The method of claim 13 wherein the ductility imparting agent is present in the consolidation composition in an amount in the range of from about 0.1% to about 10% by weight of the furan-based resin.

17. The method of claim 1 wherein the consolidation composition further comprises a surfactant.

18. The method of claim 17 wherein the surfactant comprises an ethoxylated nonyl phenol phosphate ester, an alkyl phosphonate, a non-ionic surfactant, or a mixture of one or more cationic surfactants.

19. The method of claim 18 wherein the alkyl phosphonate is a $C_{12}$-$C_{22}$ alkyl phosphonate.

20. The method of claim 17 wherein the surfactant is present in the consolidation composition in an amount in the range of from about 0% to about 15% by weight of the furan-based resin.

21. The method of claim 1 wherein the consolidation composition further comprises a diluent.

22. The method of claim 21 wherein the diluent has a flash point above about 125° F.

23. The method of claim 21 wherein the diluent comprises 2-butoxy ethanol, butyl acetate, furfuryl acetate or a mixture thereof.

24. The method of claim 21 wherein the diluent is present in the consolidation composition in an amount in the range of from about 1% to about 200% by weight of the furan-based resin.

25. The method of claim 1 wherein the temperature in the subterranean interval is above about 300° F.

26. The method of claim 1 wherein the consolidation composition further comprises a filler material.

27. The method of claim 26 wherein the filler material comprises microspheres, or silica sand.

28. The method of claim 1 wherein the consolidation composition is permitted to cure in the subterranean interval for a time period in the range of from about 6 hours to about 72 hours.

29. The method of claim 1 wherein the consolidation composition prevents or mitigates the entry of water into a subterranean well bore.

30. The method of claim 1 further comprising the step of isolating the interval prior to injecting the consolidation composition; further comprising the step of treating the interval with a precursor solution comprising an aqueous brine and a cationic surfactant prior to injecting the consolidation composition; wherein the interval is located within a subterranean well bore, further comprising the step of displacing excess consolidation composition out of the well bore; wherein the consolidation composition comprises a silane coupling agent, a ductility imparting agent, and a diluent, wherein the temperature in the subterranean interval is above about 300° F; and wherein the isolation of the interval prevents or mitigates the entry of water into a subterranean well bore.

31. A method of mitigating the production of water from a subterranean formation comprising:
   injecting a consolidation composition comprising a furan-based resin into an interval in the subterranean formation, wherein the furan-based resin comprises a phenol/phenol formaldehyde/furfuryl alcohol resin; and
   permitting the consolidation composition to cure to a desired level of strength therein without the addition of a curing agent.

32. The method of claim 31 further comprising the step of isolating the interval prior to injecting the consolidation composition.

33. The method of claim 32 wherein the interval is isolated by locating a packer above and/or below the interval.

34. The method of claim 32 further comprising the step of treating the interval with a precursor solution prior to injecting the consolidation composition.

35. The method of claim 34 wherein the precursor solution comprises an aqueous brine and a cationic surfactant.

36. The method of claim 34 wherein the interval is located within a subterranean well bore, further comprising the step of displacing excess consolidation composition out of the well bore.

37. The method of claim 31 wherein the phenol is present in the furan-based resin in an amount in the range of from about 5% to about 30% by weight.

38. The method of claim 31 wherein the phenol formaldehyde is present in the furan-based resin in an amount in the range of from about 40% to about 70% by weight.

39. The method of claim 31 wherein the furfuryl alcohol is present in the furan-based resin in an amount in the range of from about 10% to about 40% by weight.

40. The method of claim 31 wherein the consolidation composition further comprises a silane coupling agent.

41. The method of claim 40 wherein the silane coupling agent is present in the consolidation composition in an amount sufficient to bond the furan-based resin to particulates in the formation.

42. The method of claim 41 wherein the silane coupling agent is present in the consolidation composition in an amount in the range of from about 0.1% to about 5% by weight of the furan-based resin.

43. The method of claim 40 wherein the silane coupling agent comprises n-2-(aminoethyl)-3-aminopropyltrimethoxysilane, 3-glycidoxypropyltrimethoxysilane, or n-beta-(aminoethyl)-gamma-aminopropyl trimethoxysilane.

44. The method of claim 31 wherein the consolidation composition further comprises a ductility imparting agent.

45. The method of claim 44 wherein the ductility imparting agent comprises phthalate.

46. The method of claim 45 wherein the ductility imparting agent comprises diethyl phthalate, butyl benzyl phthalate, and di-(2-ethylhexyl)phthalate.

47. The method of claim 44 wherein the ductility imparting agent is present in the consolidation composition in an amount in the range of from about 0.1% to about 10% by weight of the furan-based resin.

48. The method of claim 31 wherein the consolidation composition further comprises a surfactant.

49. The method of claim 48 wherein the surfactant comprises an ethoxylated nonyl phenol phosphate ester, an alkyl phosphonate, a non-ionic surfactant, or a mixture of one or more cationic surfactants.

50. The method of claim 49 wherein the alkyl phosphonate is a $C_{12}$-$C_{22}$ alkyl phosphonate.

51. The method of claim 48 wherein the surfactant is present in the consolidation composition in an amount in the range of from about 0% to about 15% by weight of the furan-based resin.

52. The method of claim 31 wherein the consolidation composition further comprises a diluent.

53. The method of claim 52 wherein the diluent has a flash point above about 125° F.

54. The method of claim 52 wherein the diluent comprises 2-butoxy ethanol, butyl acetate, furfuryl acetate or a mixture thereof.

55. The method of claim 52 wherein the diluent is present in the consolidation composition in an amount in the range of from about 1% to about 200% by weight of the furan-based resin.

56. The method of claim 31 wherein the consolidation composition further comprises a filler material.

57. The method of claim 56 wherein the filler material comprises microspheres, or silica sand.

58. The method of claim 31 wherein the consolidation composition is permitted to cure in the subterranean interval for a time period in the range of from about 6 hours to about 72 hours.

59. The method of claim 31 wherein the consolidation composition prevents or mitigates the entry of water into a subterranean well bore.

* * * * *